United States Patent [19]
Tirumalai

[11] Patent Number: 5,809,308
[45] Date of Patent: Sep. 15, 1998

[54] METHOD AND APPARATUS FOR EFFICIENT DETERMINATION OF AN RMII VECTOR FOR MODULO SCHEDULED LOOPS IN AN OPTIMIZING COMPILER

[75] Inventor: Partha P. Tirumalai, Fremont, Calif.

[73] Assignee: Sun Microsystems, Inc., Palo Alto, Calif.

[21] Appl. No.: 560,063

[22] Filed: Nov. 17, 1995

[51] Int. Cl.$^6$ ........................................... G06F 9/45
[52] U.S. Cl. ................................................. 395/709
[58] Field of Search .................... 395/705, 708, 395/709, 800.32, 800.36

[56] References Cited

U.S. PATENT DOCUMENTS

| | | | |
|---|---|---|---|
| 5,333,284 | 7/1994 | Nugent | 395/800.32 |
| 5,367,651 | 11/1994 | Smith et al. | 395/709 |
| 5,367,687 | 11/1994 | Tarsy et al. | 395/709 |
| 5,491,823 | 2/1996 | Ruttenberg | 395/709 |
| 5,537,620 | 7/1996 | Breternitz, Jr. | 395/709 |

OTHER PUBLICATIONS

Ramakrishnan, S., "Software pipliining in PA–RISC compilers," Hewlett–Packard Journal, v43, N3, p. 39(7), Jun. 1992.

"Register Allocation for Modulo Scheduled Loops: Strategies, Algorithms and Heuristics", by B.R. Rau, M. Lee, P.P. Tirumalai, M.S. Schlansker, Computer Systems Laboratory, HPL–92–48, Apr. 1992, pp. 1–34.

"Parallelizations of WHILE Loops on Pipelined Architectures", by Parthasarathy P. Tirumalai,Meng Lee, and Michael S. Schlansker, Hewlett–Packard Laboratories, The Journal of Supercomputing, 5. (1991), pp. 119–136.

"Code Generation Schema for Modulo Scheduled Loops", B. Ramakrishna Rau, Michael S. Schlansker, P.P. Tirumalai, Hewlett–Packard Laboratories, 1992, pp. 158–169.

"UltraSparc Unleashes SPARC Performance", Next–Generation Design Could Put Sun Back in Race, by Linley Gwennap, Microprocessor Report, The Insiders Guide to Microprocessor Hardware, Oct. 3, 1994, vol. 8, No.13, pp. 5–9.

"Partners in Platform Design", To create a successful new high–performance processor, the chip architects and compiler designers must collaborate from the project's very start, Focus Report, by Marc Tremblay and Partha Tirumalai, Sun Microsystems, Inc. IEEE Spectrum, Apr. 1995,pp. 20–26.

"Overlapped Loop Support in the Cydra5", by James C. Dehnert, Apogee Software, Inc., Peter Y.T. Hsu, Sun Microsystems, Inc., and Joseph P. Bratt, Ardent Computer, pp. 26–38, 1989, ACM.

"Parallelization of Loops With Exits On Pipelined Architectures", by P.Tirumalai, M. Lee, M.S. Schlansker, Hewlett–Packard Laboratories, 1990, pp. 200–212.

(List continued on next page.)

Primary Examiner—James P. Trammell
Assistant Examiner—Peter J. Corcoran, III
Attorney, Agent, or Firm—Erwin J. Basinski

[57] ABSTRACT

Apparatus and methods are disclosed for determining a recurrence minimum iteration interval (rmii) vector for use in modulo scheduling target program instructions during the code optimization pass of an optimizing compiler. Most modem microprocessors have the ability to issue multiple instructions in one clock cycle and/or possess multiple pipelined functional units. They also have the ability to add two values to form the address within memory load and store instructions. For such microprocessors this invention can, where applicable, accelerate the process of modulo-scheduling target program loops. The invention consists of a technique to determine a rmii vector, which is a set of rmii values which correspond to different values of instruction load latency. The disclosed invention makes the determination of the entire vector with only minimal effort over determining a single rmii value.

8 Claims, 7 Drawing Sheets

OTHER PUBLICATIONS

"The Cydra5 Departmental Supercomputer", Design Philosophies, Decisions, and Trade–offs, by B. Ramakrishna Rau, David W. L. Yen, Wei Yen, and Ross A. Towle, Cydrome, Inc., Computer, Jan. 1989, pp. 12–35.

"Sentinel Scheduling for VLIW and Superscalar Processors", by Scott A. Mahike, William Y. Chen, Wen–mei W. Hwu, B. Ramakrishna Rau, and Michael S. Schlansker, Hewlett–Packard Laboratories, Center for Reliable and High–Performance Computing, Universityof Ill., 1992, pp. 238–247.

"Conversion of Control Dependence to Data Dependence", by J.R. Allen, Ken Kennedy, Carrie Porterfield & Joe Warren, Depart. of Mathematical Sciences, Rice University, IBM Corporation, 1983, pp. 177–189.

"Register Allocation for Software Pipelined Loops", B. R. Rau, M. Lee, P.P. Tirumalai, & M.S. Schlansker, Hewlett–Packard Laboratories, SIGPLAN 1992, pp. 283–299.

"Some Scheduling Techniques and An Easily Schedulable Horizontal Architecture For High Performance Scientific Computing", by B.R. Rau, and C.D. Glaeser, Advanced Processor Technology Group, ESL, Inc., Oct. 1981, pp. 183–198.

"Software Pipelining: An Effective Scheduling Technique for VLIW Machine", by Monica Lam, Depart. of Computer Science, Carnegie Mellon University, Proceedings of the SIGPLAN '88 Conference on Programming Language Design and Implementation, Jun. 22–24, 1988, pp. 318–328.

"Counterflow Pipeline Processor Architecture", Robert F. Sproull, Ivan E. Sutherland, and Charles E. Molnar, Sun Microsystems Laboratories, Inc., Apr. 1994, pp. 1–21.

"Compiler Design In C", by Allen I. Holub, Prentice Hall Software Series, 1990, pp. 673–679.

METHOD FOR COMPUTING RMII VALUES FOR LOAD LATENCY IN THE RANGE [L,H] WITHOUT REPEATEDLY SETTING THE LOAD LATENCY VALUE AND THEN COMPUTING THE CORRESPONDING RMII

METHOD AND APPARATUS FOR EFFICIENT DETERMINATION OF AN RMII VECTOR FOR MODULO SCHEDULED LOOPS IN AN OPTIMIZING COMPILER

BACKGROUND OF THE INVENTION

1. Field of the Invention

This invention relates to the field of Optimizing Compilers for computer systems. More specifically, the invention is a method and apparatus for efficient determination of an "rmii" vector for modulo scheduling of target program instructions during the code optimization pass of an optimizing compiler.

2. Background

It is desirable that computer programs be as efficient as possible in their execution time and memory usage. This need has spawned the development of computer architectures capable of executing target program instructions in parallel. A recent trend in processor design is to build processors with increasing instruction issue capability and many functional units. Some examples of such designs are Sun's UltraSparc™ (4 issue), IBM's PowerPC™ series (2–4 issue), MIPS' R10000™ (5 issue) and Intel's Pentium-Pro™ (aka P6) (3 issue). (These processor names are the trademarks respectively of Sun Microsystems, Inc., IBM Corporation, MIPS Technologies, Inc., and Intel Corporation). At the same time the push toward higher clock frequencies has resulted in deeper pipelines and longer instruction latencies. These and other computer processor architectures contain multiple functional units such as I/O memory ports, integer adders, floating point adders, multipliers, etc. which permit multiple operations to be executed in the same machine cycle. The process of optimizing the target program's execution speed becomes one of scheduling the execution of the target program instructions to take advantage of these multiple computing resource units or processing pipelines. This task of scheduling these instructions is performed as one function of an optimizing compiler. Optimizing compilers typically contain a Code Optimization section which sits between a compiler front end and a compiler back end. The Code Optimization section takes as input the "intermediate code" output by the compiler front end, and operates on this code to perform various transformations to it which will result in a faster and more efficient target program. The transformed code is passed to the compiler back end which then converts the code to a binary version for the particular machine involved (i.e. SPARC, X86, IBM, etc). The Code Optimization section itself needs to be as fast and memory efficient as it possibly can be and needs some indication of the computer resource units available and pipelining capability of the computer platform for which the target program code is written.

Compile time is not the main concern in an optimization module but it is definitely not something that can be ignored. If improperly managed, one module could end up consuming time which, if allocated to some other module, might produce better results.

In the past, attempts have been made to develop optimizing compilers generally, and code optimizer modules specifically which themselves run as efficiently as possible. A general discussion of optimizing compilers and the related techniques used can be found in the text book "Compilers: Principles, Techniques and Tools" by Alfred V. Aho, Ravi Sethi and Jeffrey D. Ullman, Addison-Wesley Publishing Co 1988, ISBN 0-201-10088-6, especially chapters 9 & 10 pages 513–723. One such attempt at optimizing the scheduling of instructions in inner loops in computer platforms with one or more pipelined functional units is a technique called "modulo scheduling." Modulo scheduling is known in the art and is generally described in the paper titled "Parallelization of WHILE Loops on Pipelined Architectures" by Parthasarathy P. Tirumalai, Meng Lee and Michael S. Schlansker, The Journal of Supercomputing, 5, pgs 119–136 (1991) which is incorporated fully herein by reference. Modulo scheduling is one form of software pipelining that extracts instruction level parallelism from inner loops by overlapping the execution of successive iterations. A brief summary of modulo scheduling is contained in the detailed description section below. Modulo scheduling makes use of two values, the Minimum Iteration Interval (MII) and the Recurrance Minimum Iteration Interval (RMII) as lower bounds on the Iteration Interval (II), which is a key metric in the modulo scheduling process. A problem occurs in the modulo scheduling process which requires the computation of the aforementioned RMII. The RMII is a lower bound on the number of clock cycles needed in a steady state to complete one iteration of a loop and is based on the dependencies between instructions (nodes in a Data Dependency Graph (DDG)). In actual practice, cases have been encountered in which the DDG was enormously complex. In these situations, computing the RMII can take an unacceptably long time. In the prior art, the process involves selection a priori of a load latency and then computing the rmii value only for this latency. This has the disadvantage that the selection of the latency value is done prematurely and without the full knowledge of how various latencies affect the rmii. A need exists to minimize the time required for calculating the rmii while at the same time providing full knowledge of the rmii values for each load latency of interest, in order that a proper value of the latency be used for the loop to be scheduled. This set of all of the load latencies is referred to here as an rmii vector. Accordingly, an efficient method for determining the mii and rmii values is essential to an effective modulo scheduling process. There is no known exploration of methods for efficient determination of an rmii vector in the prior art.

There are many important problems that have to be overcome when modulo scheduling is used to target modern micro-processors and effectively compile a wide variety of programs. For example, scheduling techniques as described in the prior art do not attempt to systematically amortize or reduce "loop overhead" instructions. (Loop overhead instructions are instructions which the compiler must insert in the executable code to load and store intermediate counter values, to increment or decrement certain counters or array addresses, etc.) Such prior art techniques generally rely on architectures such as Very Long Instruction Word (VLIW) architectures, that provide the ability to issue a large number of instructions in one clock cycle and thereby make such instruction reduction unnecessary. Moreover, some machines such as the Cydra 5 do not possess the ability to add two values to form the address used within memory load and store instructions, a feature which is required for effective reduction of address computations. Most modern microprocessors, on the other hand, do provide such a feature. To keep the instruction fetch bandwidth requirement low, they also limit the number of instructions that can be issued together in one clock cycle. Therefore, on these processors, if the number of overhead instructions is reduced then a higher number of useful instructions can be issued in the same time to perform the desired computation faster. Similarly, the RMII is an essential aspect of the modulo scheduling process and therefore the need for efficiently determining this iteration bound is critical to the efficiency of the scheduling process itself.

SUMMARY OF THE INVENTION

The present invention uses an elegant method to determine a Recurrence Minimum Iteration Interval ("rmii") vector containing different values for various different load latencies, the calculation method reducing the computation time required to get the rmii vector which can then be used to select an appropriate load latency value for use in scheduling. This invention is contained in the scheduling section of an optimizing compiler which uses modulo scheduling techniques thereby improving the execution speed of the executable code on a target computer platform.

In one aspect of the invention, a computer controlled method of determining a set of values for a recurrence minimum iteration interval is disclosed, the set of values called a rmii vector, where this rmii vector is to be used in scheduling the executable instructions of a target computer program directed to a target computer architecture having one or more cache memories with different load latencies. The method designates a range of latency values which are preset into the compiler and are determined by the target computer architecture. The method further discloses a process of traversing a data dependency graph which represents at least a portion of the target program, during which traversal values associated with the edges of the graph are collected and represent, for an elementary cycle in the graph, the number of load latency edges encountered, the sum of the execution latencies encountered and an indication as to whether a value determined in one cycle of the code is used in subsequent cycles. These three values are then used to compute the load latency value for the cycle encountered, and similar values are thereafter computed for each of the target computer architecture range of latency values, thereby producing the desired mrii vector of latency values which can be used thereafter for modulo scheduling the target program instructions.

In another aspect of the invention, a computer system is disclosed for use in compiling target computer programs having a compiler system resident therein, a load latency determination mechanism coupled to the code optimizer portion of the compiler for determining a rmii vector of values to be used in modulo scheduling the target program instructions.

In yet another aspect of the invention, a computer program product is disclosed, having a computer usable medium having computer readable program code mechanisms embodied therein which include computer readable mechanisms to determine a rmii vector for use by a compiler mechanism in modulo scheduling instructions for a target computer program.

DESCRIPTION OF THE DRAWINGS

The objects, features and advantages of the system of the present invention will be apparent from the following description in which.

NOTATIONS AND NOMENCLATURE

Figure 1:
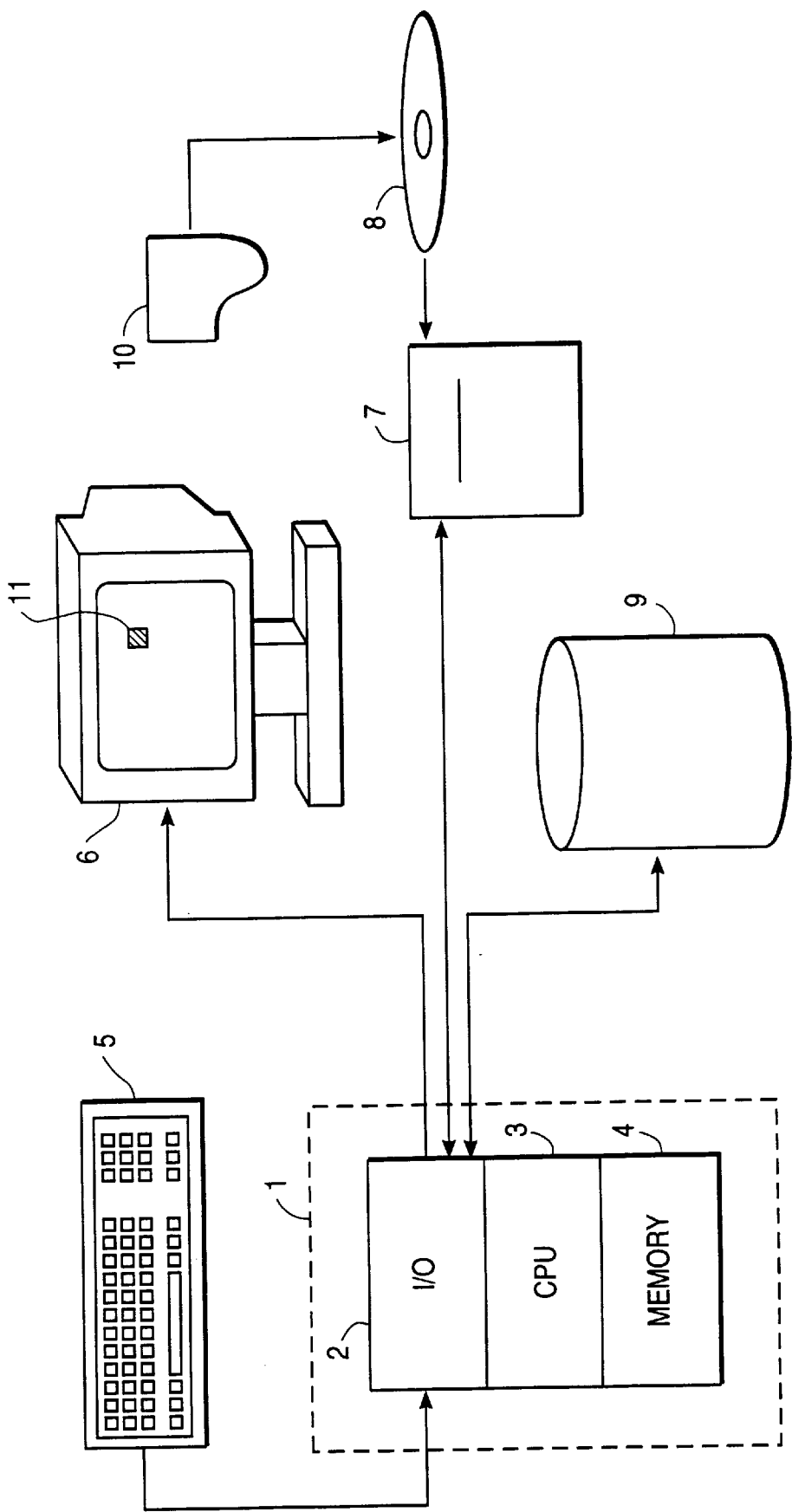
FIG. 1 illustrates a portion of a computer, including a CPU and conventional memory in which the present invention may be embodied.

The detailed descriptions which follow are presented largely in terms of procedures and symbolic representations of operations on data bits within a computer memory. These procedural descriptions and representations are the means used by those skilled in the data processing arts to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be understood, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be understood the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. In particular, various general purpose machines may be used with programs written in accordance with the teachings herein, or it may prove more convenient to construct more specialize apparatus to perform the required method steps. The required structure for a variety of these machines will appear from the description given.

DESCRIPTION OF THE PREFERRED EMBODIMENT

Apparatus and methods are disclosed for determining a recurrence minimum iteration interval (rmii) vector for use in modulo scheduling target program instructions during the code optimization pass of an optimizing compiler. Most modern microprocessors have the ability to issue multiple instructions in one clock cycle and/or possess multiple pipelined functional units. For such microprocessors this invention can, where applicable, accelerate the process of modulo-scheduling loops in the target program code. The invention consists of a technique to determine a rmii vector, which is a set of rmii values which correspond to different values of instruction load latency. The disclosed invention makes the determination of the entire vector with only minimal effort over determining a single rmii value. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily. Similarly, in the preferred embodiment, use is made of uni-processor and multi-processor computer systems as well as the SOLARIS operating system, including specifically the ULTRASPARC processor and the SUN SPARC compiler version 4.0, all of which are made and sold by Sun Microsystems, Inc. the assignee of this present invention. However the present invention may be practiced on other computer hardware systems and using other operating systems.

Operating Environment

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data.

Figure 2:
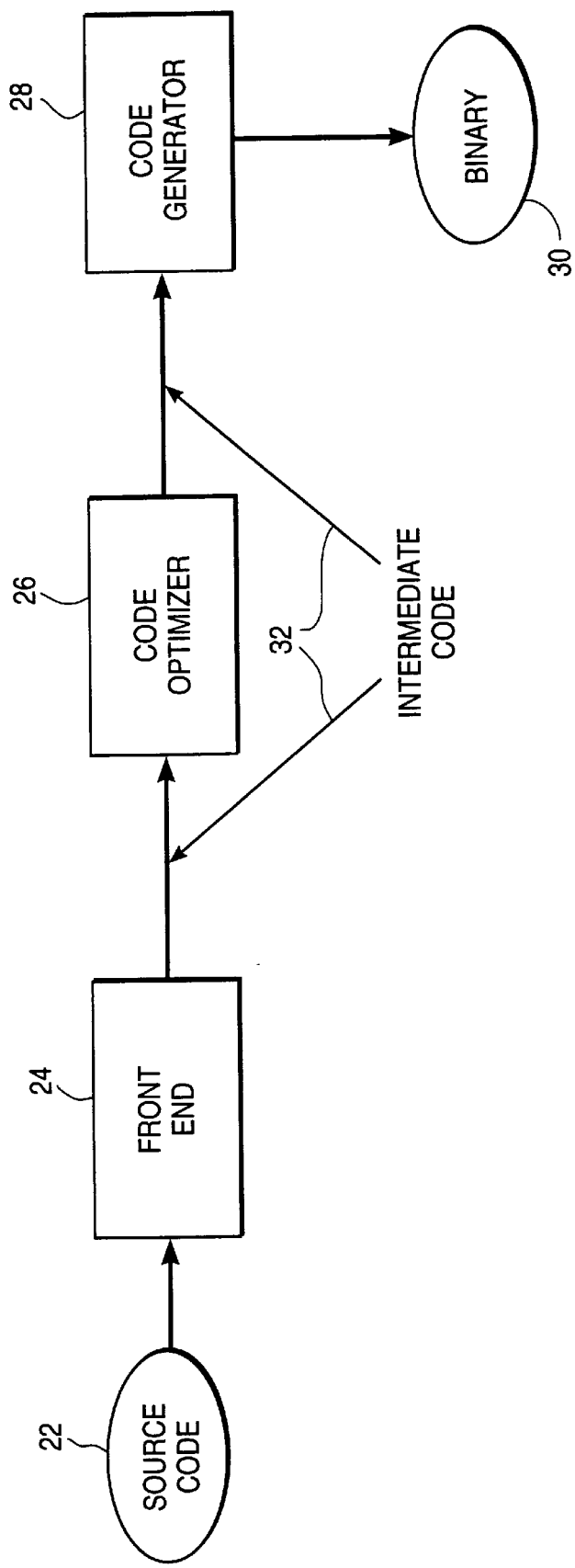
FIG. 2 illustrates a typical compiler showing the position of the code optimizer.

FIG. 2 illustrates a typical optimizing compiler 20, comprising a front end compiler 24, a code optimizer 26 and a back end code generator 28. The front end 24 of a compiler takes as input a program written in a source language 22 and performs various lexical, syntactical and semantic analysis on this language outputting an intermediate set of code 32 representing the target program. This intermediate code 32 is used as input to the code optimizer 26 which attempts to improve the intermediate code so that faster-running machine binary code 30 will result. Some code optimizers 26 are trivial and others do a variety of computations in an attempt to produce the most efficient target program possible. Those of the latter type are called "optimizing compilers" and include such code transformations as common sub-expression elimination, dead-code elimination, renaming of temporary variables and interchange of two independent adjacent statements as well as register allocation.

Figure 3:
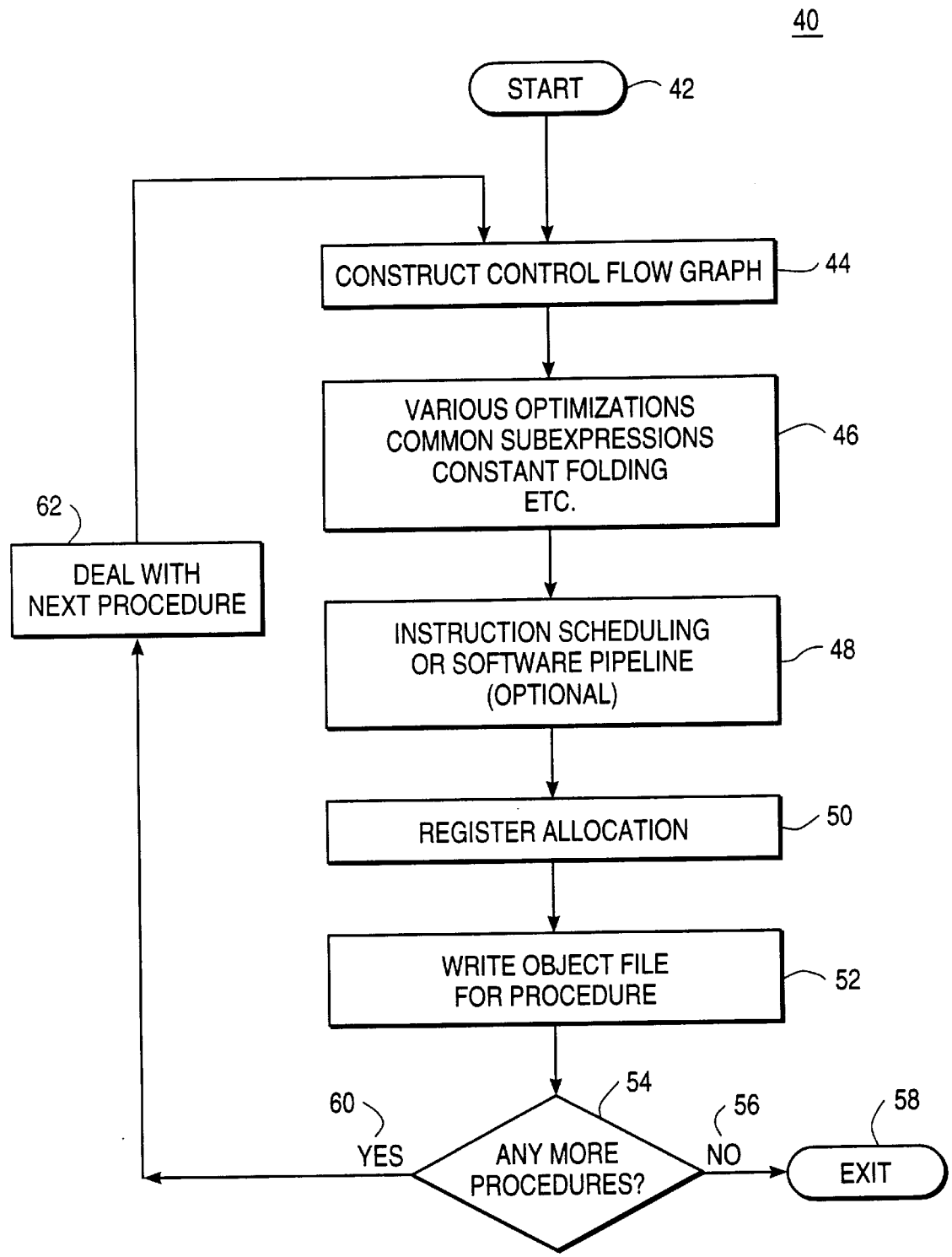
FIG. 3 illustrates a large scale organization of a code optimizer.

FIG. 3 depicts a typical organization of an optimizing compiler 40. On entry of the intermediate code 42 a Control Flow Graph is constructed 44. At this stage the aforementioned code transformations (common sub-expression elimination, dead-code elimination, renaming of temporary variables and interchange of two independent adjacent statements, etc.) take place 46. Next instruction scheduling or "pipelining" may take place 48 at this point. Then "register allocation" is performed 50 and the modified code is written out 52 for the compiler back end to convert it to the binary language of the target machine (i.e. SPARC, X86, etc). It is this "Instruction Scheduling" 48 process which is the focus of applicants' invention.

Modulo Scheduling

Figure 4:
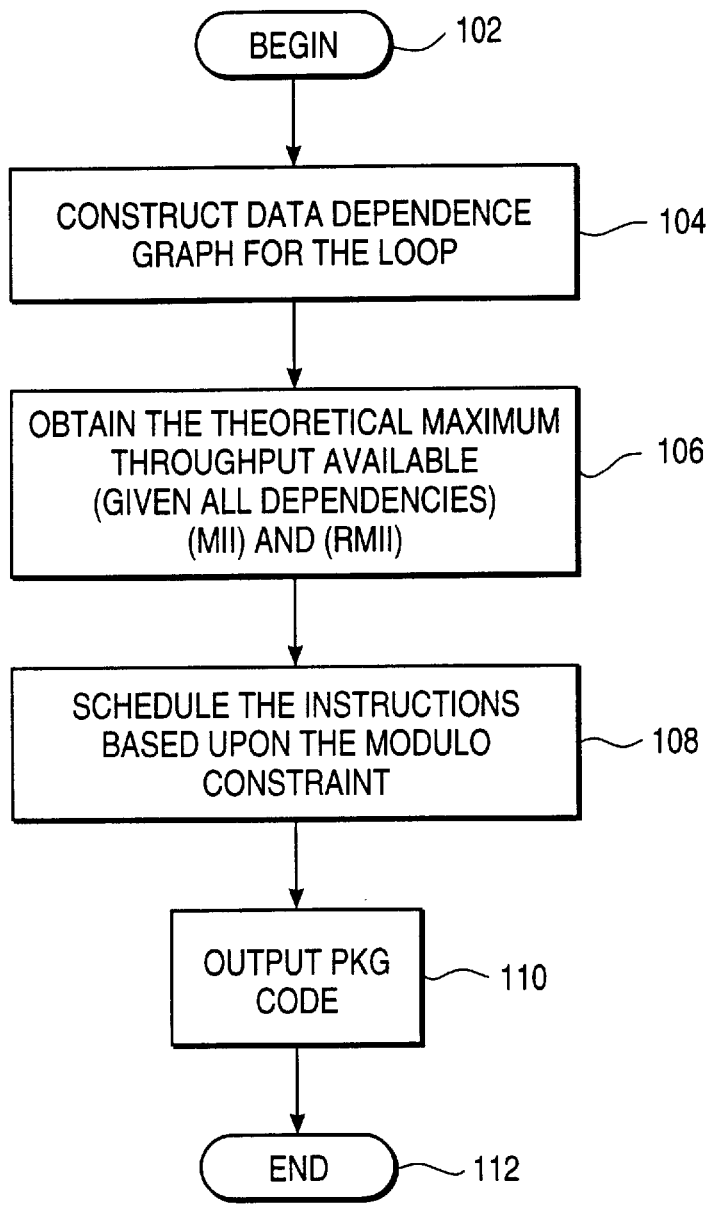
FIG. 4 illustrates an organization of the Instruction Scheduling portion of FIG. 3 as typical in the Prior Art use of modulo scheduling.

Referring now to FIG. 4, a general flow chart of the prior art Optimizing Compiler Modulo Scheduling operation is depicted 100. Upon entry to this section of the Optimizing Compiler 102 incoming intermediate data is processed and the data representing a loop is used to construct a Data Dependency Graph (DDG) 104. Using this DDG the scheduler determines a theoretical maximum throughput possible for this loop, given all the data dependencies and the resource requirements 106. That is, considering the data dependencies of each instruction and the resource requirements (such as a memory port, integer add unit, floating point unit, etc.) a calculation is made to determine the minimum iteration interval (mii) and the recurrence minimum iteration interval (rmii). Next all instructions in the loop are scheduled obeying the modulo constraint 108. The output of the scheduling pass 108 is a schedule in PKE format 110, and the scheduling process for the loop is completed 112.

Brief Summary of Modulo Scheduling

Figure 5:
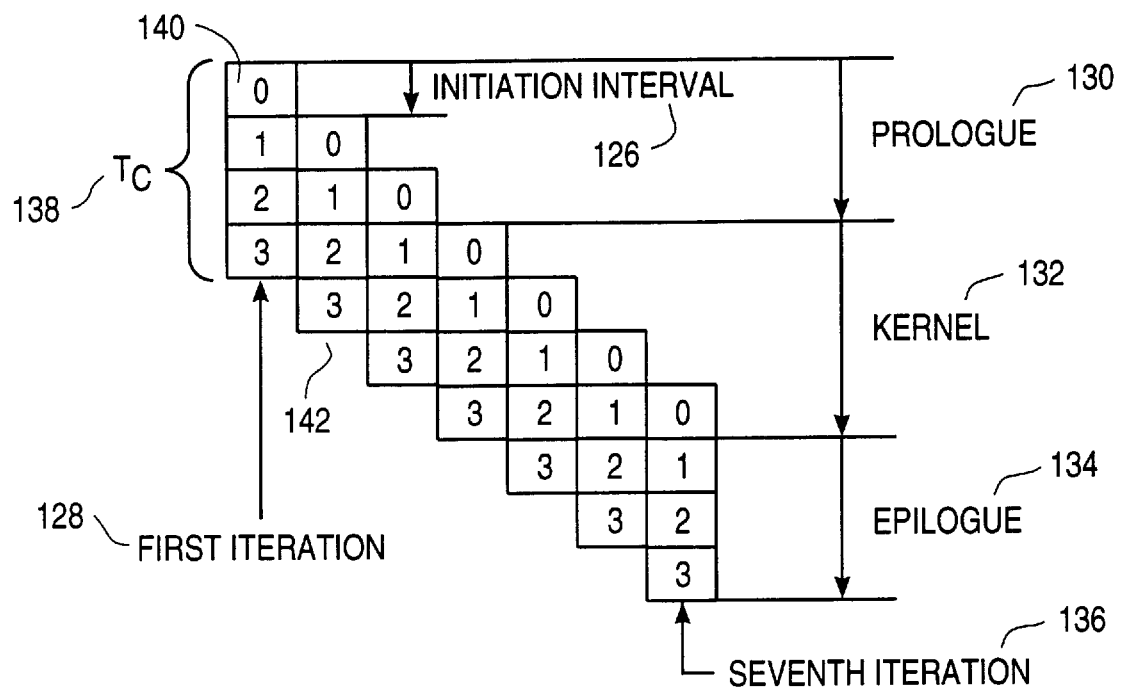
FIG. 5 illustrates a four-stage seven iteration pipeline.

Modulo scheduling has been described in the literature as indicated above. Nevertheless it is helpful at this point to summarize the process for completness. The key principles are as follows. Parallel instruction processing is obtained by starting an iteration before the previous iteration has completed. The basic idea is to initiate new iterations after fixed time intervals. This time interval is called the initiation interval or the iteration interval (II). FIG. 5 shows the execution of seven iterations of a pipelined loop. If we let the scheduled length of a single iteration be TL 138 and let it be divided into stages each of length II 126. The stage count, SC is defined as, SC=[TL/II], or in this case TL=4 (138 in FIG. 5) and II=1 126 and SC=[4/1]=4. Loop execution begins with stage 0 140 of the first iteration 128. During the first II cycles, no other iteration executes concurrently. After the first II cycles, the first iteration 128 enters stage 1 and the second iteration 142 enters stage 0.

New iterations join every II cycles until a state is reached when all stages of different iterations are executing. Toward the end of loop execution no new iterations are initiated and those that are in various stages of progress gradually complete.

These three phases of loop execution are termed the prologue 130, the kernel 132 and the epilogue 134. During the prologue 130 and the epilogue 134 not all stages of successive iterations execute; this happens only during the kernel phase 132. The prologue 130 and the epilogue 134 last for (SC−1)*II cycles. If the trip count of the loop is large (that is, if the loop is of the type where say 100 iterations of the loop are required), the kernel phase 132 will last much longer than the prologue 130 or the epilogue 134. The primary performance metric for a modulo scheduled loop is the initiation interval, II 126. It is a measure of the steady state throughput for loop iterations. Smaller II values imply higher throughput. Therefore, the scheduler attempts to derive a schedule that minimizes the II. The time to execute n iterations is, $T(n)=(n+SC-1) \times II$. The throughput approaches II as n approaches infinity.

Scheduling proceeds as follows. The data dependence graph (DDG) for the loop is constructed. Nodes in this (directed) graph correspond to instructions, and arcs to dependences between them. Arcs possess two attributes: latency and omega. Latency is the number of clocks of separation required between the source and the destination, and omega is the iteration distance between the two. (That is, if one iteration calculates a value for the destination instruction which is to be used in the next iteration, the omega value would be 1). Prior to scheduling, two bounds on the maximum throughput, the MII and the RMII, are derived. The MII is a bound on the minimum number of cycles needed to complete one iteration and is based only on processor resources. It is a bound determined by the most heavily used resource. For example, if a loop has 10 add operations and the processor can execute at most two adds per clock (that is, it has two add units), then the add unit resource would limit the iteration throughput to at most one iteration every five clocks (that is, 10 add operations devided by 2 add units per clock cycle=5 clock cycles to do the 10 adds). The MII is computed by taking each resource in turn and then taking the maximum of the bounds imposed by each. The RMII is a bound based on the minimum number of clocks needed to complete one iteration and is based only on dependences between nodes. Cycles in the DDG imply that a value Xj computed in some iteration i is used in a future iteration j and is needed to compute the similarly propagated value in iteration j. These circular dependences place a limit on how rapidly iterations can execute because computing the values needed in the cycle takes time. For each elementary cycle in the DDG, the ratio of the sum of the instruction latencies (l) to the sum of the omegas (d) is computed. This value limits the iteration throughput because it takes l clocks to compute values in a cycle that spans d iterations. That is, if a dependency edge i in a cycle has latency $d_i$ and connects operations that are $\Omega_i$ iterations apart, then, RMII=maximum over all elementary cycles of ($\Sigma d_i$ cycle edges divided by $\Sigma \Omega_i$ cycle edges).

For example, if an address add self-recurrence takes $\Sigma d_i=3$ cycles and generates the address for use in the next iteration (i.e. omega=1) then RMII=3/1=3.

The fixed spacing between overlapped iterations forces a constraint on the scheduler other than the normal constraints imposed by the arcs in the DDG. Note that placing an operation at a time t implies that there exists a corresponding operation in the kth future iteration at (t+k*II). Operations using the same resource must be placed at different times, modulo the II. This is referred to as the "modulo constraint". It states that if an operation uses a resource at time $t_1$ and another operation uses exactly the same resource at time $t_2$, then $t_1$ and $t_2$ must satisfy "$t_1$modulo II is not equal to $t_2$modulo II". The scheduler begins by attempting to derive a schedule using II=max(MII, RMII). If a schedule is not found, the II is incremented. The process repeats until a schedule is found or an upper limit is reached. After scheduling, the kernel has to be unrolled and definitions renamed to prevent values from successive iterations from overwriting each other. "Unrolling the kernel" is defined as creating multiple copies of the kernel in the generated code. The minimum kernel unroll factor (KUF) needed is determined by the longest value lifetime divided by the II because corresponding new lifetimes begin every II clocks. (The "lifetime" of a value is equal to the time for which a value exists; i.e. from the time its generation is started until the last time it is used or could be used). Remainder iterations (up to KUF-1) use a cleanup loop.

The problem

Unpredictable load latencies

The time to complete a load varies depending on whether the access hits or misses in the cache (or caches in the case of multi-level cache hierarchy). What latency then should the modulo scheduler use when scheduling loads? High values could stretch the schedule and create register pressure. Low values could result in bubbles. In the preferred embodiment, Two policies are used in conjunction to decide the value to be used. The first policy is to schedule integer loops (no floating point accesses) to the L1 cache, and the others (floating point loops) to the L2 cache. (The L1 cache is an one chip cache which is fed by a slower off-chip cache, L2, which itself is typically fed by local memory or even a local disk memory.). There are three reasons that motivate this. First, integer programs tend to have good hit rates in L1. Second, scheduling them to L2 would create high register pressure as both data and addresses vie for the limited integer registers. Note that with floating point loops, data resides in the fp registers whereas addresses reside in the integer registers. And third, integer loops tend to have low trip counts. Long load latencies are less effective on such low trip counts because of the higher start up cost.

The second policy is based on an examination of the DDG. If the loop is limited by an RMII cycle that contains a load-use edge, then such a loop is not likely to benefit from the long latency used. For such loops, the load latency is dropped until the RMII and the MII are about equal. Lowering the latency further does not help the loop because it will then be constrained by the MII. This novel strategy helps many RMII limited loops. It is an analytical way of approximating the effect of pro-gram directives that have been previously supplied to such loops. Implementation of this policy requires that the concept of the RMII be extended to the RMII vector each element of which corresponds to different values of the load latency. These details are described below.

In most modern computer systems the latency of a load operation (the time elapsed between the issue of the load instruction and the return of the requested data) can vary depending on many factors. Modulo scheduling loops on such machines requires that allowance be made for such variation in the load latency. As indicated above, one important parameter used in the modulo scheduling process is the RMII. The RMII can vary depending on the load latency used during scheduling. This means that different values of RMII can be computed for each different load latency. Here these different values are referred to as the RMII vector. Computing the RMII for even one load latency is time consuming, and consequently computing it many times for each different load latency would be even more time consuming.

Figure 6:
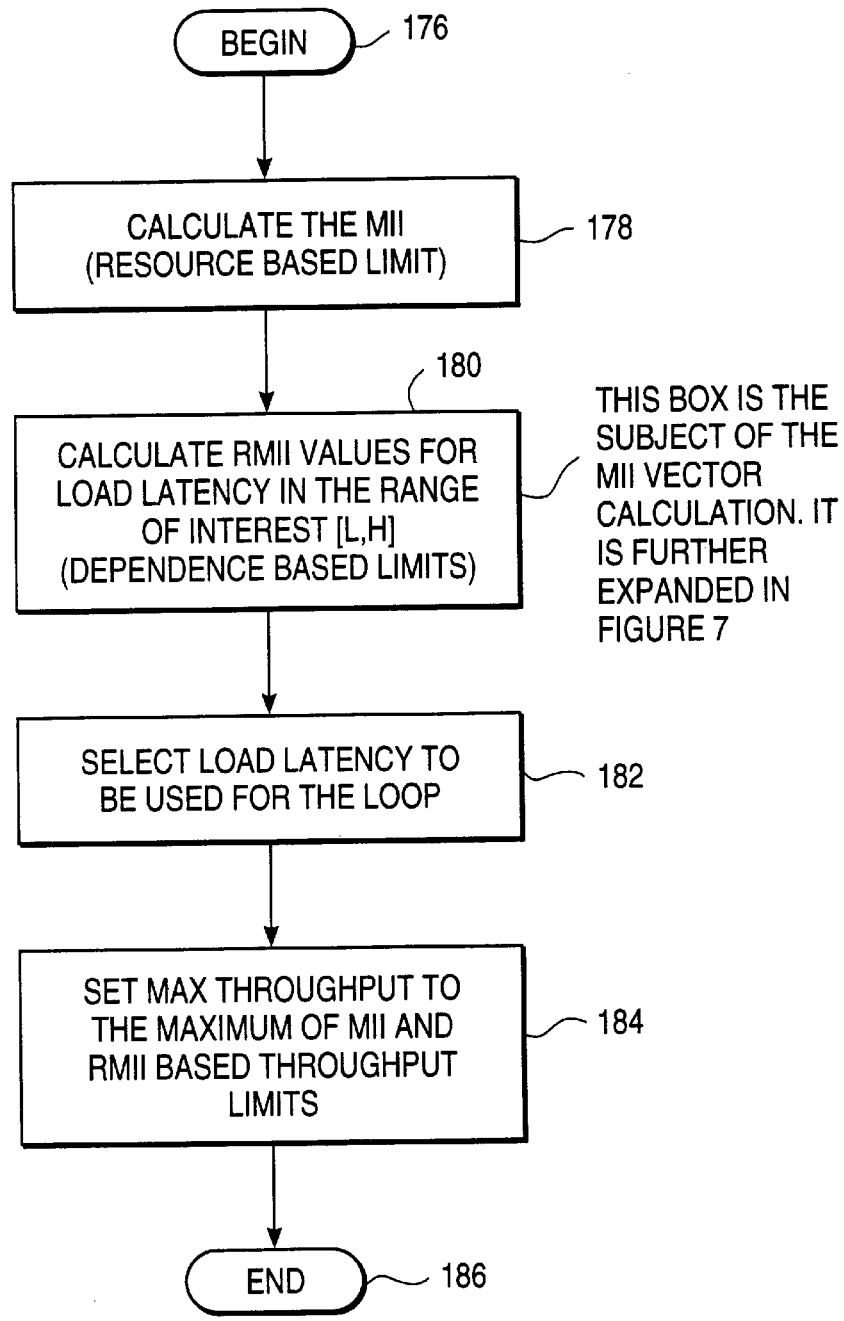
FIG. 6 illustrates in more detail a process for determining the theoretical maximum throughput available considering all dependencies.

Referring to FIG. 6, the portion of the modulo scheduling process which obtains the theoretical maximum throughput estimates considering all data and resource dependencies is described. This will indicate where the values mii and rmii are determined and how they are used.

In FIG. 6 the process for obtaining the theoretical maximum throughput bounds 175 (this expands box 106 of FIG. 4) is depicted. In FIG. 6 on entry 176 the value for mii is calculated. As described above, the MII is a lower bound on the number of clock cycles needed in steady state to complete one iteration and is based only on processor resources. It is a bound determined by the most heavily used resource. For example, if a loop has 10 add operations and the processor can execute at most two adds per clock (that is, it has two add units), then the add unit resource would limit the iteration throughput to at most one iteration every five clocks (that is, 10 add operations devided by 2 add units per clock cycle=5 clock cycles to do the 10 adds). The MII is computed by taking each resource in turn and then taking the maximum of the bounds imposed by each. Then rmii values for load latency in the range of interest [L, H] is calculated 180. An appropriate load latency is selected for use in the scheduling of the loop instructions 182. The maximum throughput is set to the maximum of the computed mii and rmii values 184 and this routine exits 186 to the scheduling routine. It is the determination of the rmii vector 180 which is the subject of this invention and is now described.

The Invention—Efficient Determination of an RMII Vector for Modulo Scheduled Loops The invention disclosed herein comprises a technique for determining the RMII vector efficiently, wherein the determination of the entire RMII vector is possible with only a minimal of extra work over determining the RMII once.

Figure 7:
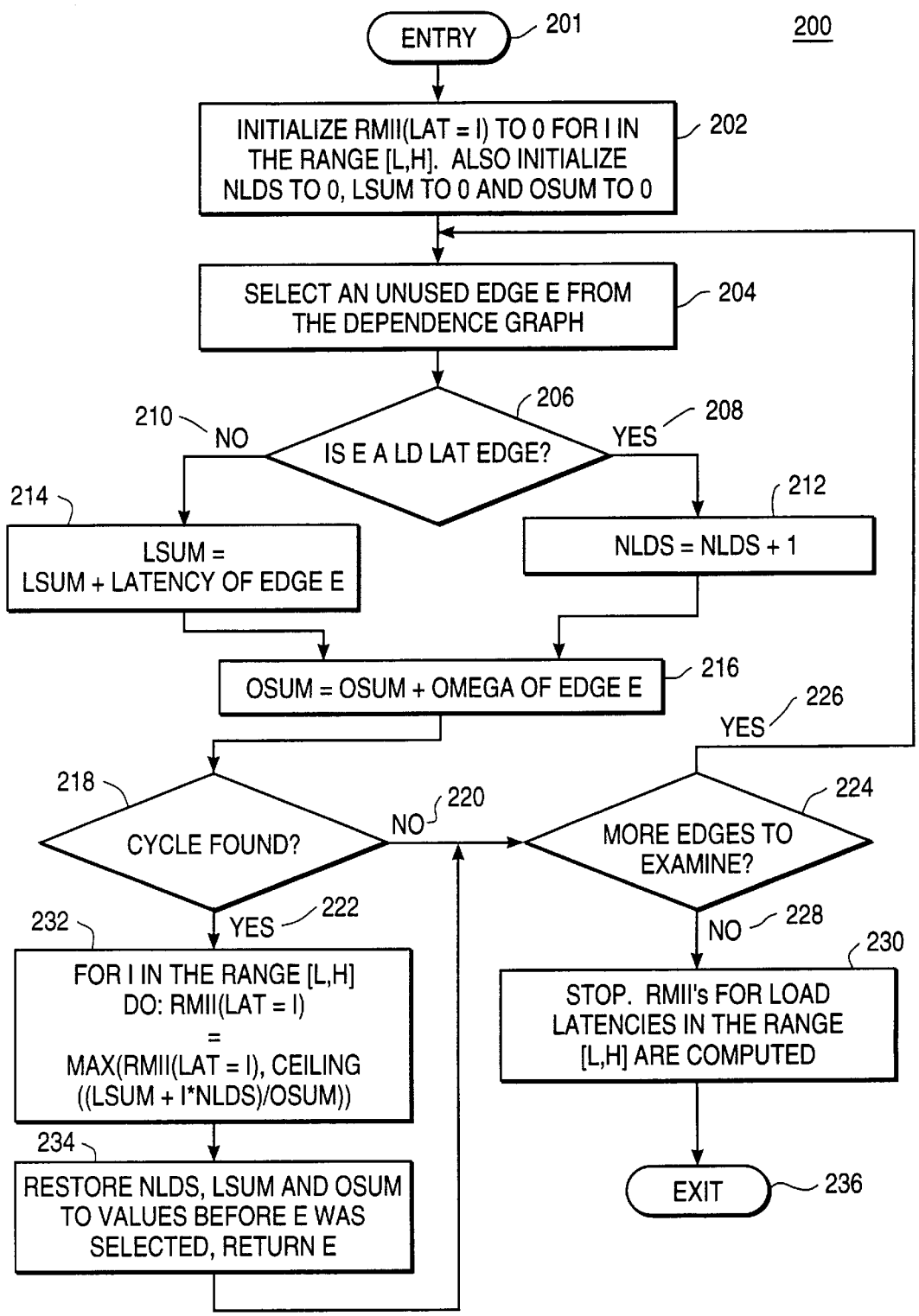
FIG. 7 illustrates a flow chart showing the process for determining the rmii vector.

Referring now to FIG. 7 the basic process of producing the rmii vector is summarized 200. To understand the following description some additional background information is necessary. The target program instruction loop in consideration can be represented by a data dependence graph (DDG). Each directed edge in the graph represents a dependence. Three attributes on the edges are required: whether this edge is a load latency or not; the latency of the edge (required only if it is NOT a load latency edge); and the omega value on the edge. FIG. 6 depicts the process for computing rmii values for load latency in the range [L, H] without repeatedly setting the load latency value and then computing the corresponding rmii. The values "L" and "H" are load latency values representing the lowest load latency and highest load latency respectively for resources (i.e. caches and other memory devices) in the architecture of the target computer platform. These values are set in the compiler based on this target architecture. Upon entry to this process 201 values are initialized for nlds (the number of load latency edges), lsum (the sum of the latencies encountered), osum (the sum of the omega values encountered) and the elements of the rmii vector are set to zero. Next a search is made for elementary cycles in the graph. An elementary cycle is a cycle where no node in the cycle is visited more than once except the node where the cycle is started and ended which is visited twice. In this search, unused edges in the DDG are traversed successively while looking for cycles. The process is as follows. Select an unused edge "e" from the graph 204. If this edge e is a load latency edge 208, the value nlds is incremented by one 212. If edge e is not a load latency edge 210 then the value lsum is incremented by the latency value associated with edge e 214. In either case 216 the value osum is incremented by the value of omega associated with edge e. If e forms a cycle 222 update the rmii vector as follows. For each load latency i, compute the ceiling of (lsum+i*nlds)/osum. (Note "ceiling" in this context means the next highest integer value. For example, if the computation "(lsum+i*nlds)/osum" was "(5+ 2*2)/2"=2.5, then the ceiling of this value 2.5 is 3, the next highest integer. Note also that the value "osum" must be greater than zero if an elementary cycle is found.) Let this value be "$v_i$". Then, update the rmii value at each latency i as, rmii(i)=max(rmii(i), $v_i$). This is equivalent to the process shown in block 232. The values nlds, lsum and osum are restored to the values before edge e was selected 234 and the search for more edges proceeds 224. If the edge e does not form a cycle 220 then another edge is examined 224. This process continues until there are no more edges to be examined 228 and this process is complete 236.

The fundamental idea here is to keep track of three independent items as each cycle is found. These three items are the number of load latency edges, the total latency of the other edges and the total omega of all of the edges. Knowing these three items for any cycle allows the rmii contribution of a cycle to be computed very quickly for any load latency. This is the value "$v_i$" above. Then as each cycle is detected, the entire rmii vector can be updated. Together the separation of these three contributing items and the updating of the rmii vector after cycle detection provide for the computation of the rmii vector with only a small amount of extra work over computing the rmii for a single load latency. With this mechanism in place, the rmii need not be computed afresh for each load latency.

An Example

Here is an example of how the rmii vector calculation works. Let L=2 and H=8 for this example.

First the vector is initialized to be all zero for each load latency: [0 0 0 0 0 0 0]→each element corresponds to the RMII for a particular load latency in the range 2 through 8.

Then the DDG is searched. Suppose that we find a cycle with lsum=5, nlds=1 and osum=2. Then the rmii vector is updated for each load latency as follows:

$i$=2: rmii(lat=2)=max{0, ceil((5+2*1)/2)}=max{0, 4}=4

$i$=3: rmii(lat=3)=max{0, ceil((5+3*1)/2)}=max{0, 4}=4

$i$=4: rmii(lat=4)=max{0, ceil((5+4*1)/2)}=max{0, 5}=5

. . . and so on.

Thus the rmii vector at the end of the updating will look like this:

[4 4 5 5 6 6 7]

The DDG will continue to be searched and suppose that the next cycle that is found has lsum=5, nlds=0 and osum=1. The rmii vector will then be updated as follows:

$i$=2: rmii(lat=2)=max{4, ceil((5+2*0)/1)}=max{4, 5}=5

$i$=3: rmii(lat=3)=max{4, ceil((5+3*0)/1)}=max{4, 5}=5

$i$=4: rmii(lat=4)=max{5, ceil((5+4*0)/1)}=max{5, 5}=5

. . . and so on.

At the end of this step the rmii vector will look like this:

[5 5 5 5 6 6 7]

This process will continue until the DDG has been completely searched. Suppose that the rmii vector when this happens looks like this:

[7 8 9 10 11 12 13]→RMI vector at the end of the search.

This means that the rmii values for various load latencies are as follows:

for load latency=2 the rmii is 7 for load latency=3 the rmii is 8

. . . and so on.

Thus, RMII values for all load latencies in the range of interest 2 through 8 have been computed.

Additional Considerations

It will be appreciated by those skilled in the art that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer controlled method of determining a set of values for a recurrence minimum iteration interval, said set designated an "rmii vector," said set of values associated with a program instruction loop, for use in scheduling the executable instructions of a target program directed at a target computer architecture having one or more cache memories with different load latencies, said method comprising the steps of:

a. designating a range of latency values which represent a smallest and a largest latency value that is representative of the target computer architecture, said range comprising consecutive integer values from a value representing the smallest latency to a value representing the largest latency of the target computer architecture;

b. traversing edges which connect nodes in the data dependency graph while seeking to identify an elementary cycle in a current loop, wherein an edge has at least three values associated with the edge, these values signifying whether the edge represents a load latency, whether the edge represents an execution latency and whether a computed value is used in a present iteration of the cycle;

c. accumulating a first value ("nlds") representing how many edges in the elementary cycle signify a load latency, a second value ("lsum") representing a sum of execution latencies in the elementary cycle and a third value ("osum") which is a value greater than zero which represents how many iterations will occur before a value computed in the elementary cycle is used; and d. determining a set of values for a recurrence minimum iteration interval ("rmii") associated with the identified elementary cycle, by developing for each value in the designated range of latency values, a value for rmii as a function of said first value, said second value, said third value and said each value in the designated range of latency values, thereby producing a vector of values representing rmii for said each value in the designated range of latency values for said elementary cycle, designated a "current cycle rmii vector", whereby this current cycle rmii vector is produced as a by product of traversing the data dependency graph.

2. The method of claim 1 wherein an elementary cycle is a cycle wherein no node in the cycle is visited more than once except for a node where the cycle begins and ends.

3. The method of claim 1 wherein the step of determining a set of values for a recurrence minimum iteration interval ("rmii") associated with the identified elementary cycle comprises the additional steps of:

for a given value i representing one of said designated range of latency values, providing a fourth value corresponding to the second value plus i times the first value;

dividing said fourth value by said third value to produce a fifth value; and rounding up the fifth value to an integer value which is a next higher integer to the original fifth value to produce a sixth value which represents said one of said designated range of latency values, an mrii value, designated "mrii(i)" corresponding to the given value i.

4. A computer controlled method of determining a set of values for a recurrence minimum iteration interval, said set designated an "rmii vector," said set of values associated with a program instruction loop, for use in scheduling the executable instructions of a target program directed at a target computer architecture having one or more cache memories with different load latencies, said method comprising the steps of:

a. designating a range of latency values which represent a smallest and a largest latency value that is representative of the target computer architecture, said range comprising consecutive integer values from a value representing the smallest latency to a value representing the largest latency of the target computer architecture;

b. initializing values to zero in a current loop rmii vector, wherein each of said values in said current loop rmii vector correspond to one of said designated range of latency values;

c. identifying a data dependency graph of a portion of the target program, said portion designated a "current loop";

d. traversing edges which connect nodes in the data dependency graph while seeking to identify an elementary cycle in the current loop, wherein an edge has at least three values associated with the edge, these values signifying whether the edge represents a load latency, whether the edge represents an execution latency and whether a computed value is used in a present iteration of the cycle, an elementary cycle being one wherein no node in the cycle is visited more than once except for a node where the cycle begins and ends;

e. accumulating a first value ("nlds") representing how many edges in the elementary cycle signify a load latency, a second value ("lsum") representing a sum of execution latencies in the elementary cycle and a third value ("osum") which is a value greater than zero which represents how many iterations will occur before a value computed in the elementary cycle is used;

f. determining a set of values for a recurrence minimum iteration interval ("rmii") associated with the identified elementary cycle, by developing for each value in the designated range of latency values, a value for rmii as a function of said first value, said second value, said third value and said each value in the designated range of latency values, thereby producing a vector of values representing rmii for said each value in the designated range of latency values for said elementary cycle, designated a "current cycle miii vector";

g. modifying said set of values in said current cycle mrii vector, by comparing said set of values in the current cycle rmii vector with an equivalent set of values in the current loop rmii vector, and selecting the maximum value from the current cycle rmii vector and the current loop rmii vector for each given value in the designated range of latency values, and inserting the selected values in the current loop rmii vector; and h. identifying a next elementary cycle of the current loop from the data dependency graph, and performing steps d through g again until no additional elementary cycles in the current loop are found, whereby the last current loop rmii vector will contain a range of latency values to be used in subsequent target program instruction scheduling with no need for additional computation of latency values.

5. A computer system having a central processing unit (CPU) and random access memory (RAM) coupled to said CPU, for use in compiling a target program to run on a target computer architecture having one or more cache memories with different load latencies, said computer system comprising:

a compiler system resident in said computer system having a front end compiler, a code optimizer and a back end code generator;

a load latency determination mechanism configured to determine a rmii vector comprising load latency values for at least a portion of the target program instructions to be scheduled, said load latency values being calculated for a range of load latencies, said load latency determination mechanism coupled to said code optimizer; and a modulo scheduler mechanism coupled to said code optimizer configured to modulo schedule instructions for said target program by using said rmii vector to determine a load latency value to use in scheduling said instructions.

6. An apparatus for optimizing the execution time of executable instructions in a target program which is designated to run on a target computer architecture having one or more cache memories with different load latencies, said apparatus comprising:

a computer having a processor, a memory, and an input/output section;

a compiler system resident in said computer memory having a front end compiler, a code optimizer and a back end code generator;

a load latency determination mechanism configured to determine a rmii vector comprising load latency values for at least a portion of the target program instructions to be scheduled, said load latency values being calculated for a range of load latencies, said load latency determination mechanism coupled to said code optimizer; and a modulo scheduler mechanism coupled to said code optimizer configured to modulo schedule instructions for said target program by using said rmii vector to determine a load latency value to use in scheduling said instructions.

7. A code optimizer for use in an compiler system for compiling a target program to run on a target computer architecture having one or more cache memories with different load latencies, said code optimizer comprising:

a first portion configured to accept as input an intermediate code representation of said target program;

a second portion, coupled to said first portion, configured to determine a rmii vector comprising load latency values for at least a portion of the target program instructions to be scheduled, said load latency values being calculated for a range of load latencies, said load latency determination mechanism coupled to said code optimizer; and a third portion, coupled to said second portion configured to modulo schedule instructions for said target program by using said rmii vector to determine a load latency value to use in scheduling said instructions.

8. A computer program product comprising:

a computer usable medium having computer readable program code mechanisms embodied therein to schedule the executable instructions of a target program directed at a target computer architecture having one or more cache memories with different load latencies, the computer readable program code mechanisms in said computer program product comprising:

computer readable compiler system resident in said computer system having a front end compiler, a code optimizer and a back end code generator;

computer readable load latency determination code mechanisms to determine a rmii vector comprising load latency values for at least a portion of the target program instructions to be scheduled, said load latency values being calculated for a range of load latencies, said load latency determination mechanism coupled to said code optimizer; and a computer readable modulo scheduler code mechanism coupled to said code optimizer configured to modulo schedule instructions for said target program by using said rmii vector to determine a load latency value to use in scheduling said instructions.

* * * * *